United States Patent [19]

Bauer

[11] 4,145,986

[45] Mar. 27, 1979

[54] RING TYPE CALIBRATING CAGE

[75] Inventor: Paul A. Bauer, South Holland, Ill.

[73] Assignee: The Continental Group, Inc., New York, N.Y.

[21] Appl. No.: 804,970

[22] Filed: Jun. 9, 1977

[51] Int. Cl.² ............................................. B21D 51/26
[52] U.S. Cl. ............................... 113/7 R; 113/116 W; 219/64; 228/17.5; 228/46
[58] Field of Search ................... 228/17.5, 46, 49 R; 219/64; 113/116 W, 8, 7 R

[56] References Cited

U.S. PATENT DOCUMENTS

| | | | |
|---|---|---|---|
| 1,085,639 | 2/1914 | Snodgrass | 222/17.5 X |
| 2,986,811 | 6/1961 | Rudd | 228/46 X |
| 3,203,085 | 8/1965 | Turner | 228/46 UX |
| 3,452,424 | 7/1969 | Morris | 228/17.5 |
| 3,834,010 | 9/1974 | Wolfe et al. | 219/64 X |

FOREIGN PATENT DOCUMENTS 2426379  2/1975  Fed. Rep. of Germany .......... 228/17.5

*Primary Examiner*—Leon Gilden
*Attorney, Agent, or Firm*—John J. Kowalik; Joseph E. Kerwin; William A. Dittmann

[57] ABSTRACT

A ring type calibrating cage for confining a metal container shell just prior to and during seam welding. The cage comprises a series of strategically located rings through which the can body is fed. These rings are of narrow width reducing friction drag and being optimally positioned to accurately hold the can body in cylindrical shape with overlapped edge portions particularly when these edge portions enter into the welding nip.

11 Claims, 10 Drawing Figures

RING TYPE CALIBRATING CAGE

BACKGROUND OF THE INVENTION

The calibrating cage on a Z-bar type body forming machine is a device which confines the shell formed by a rolled body blank just prior to and during the seam welding process. This confinement is provided by structurally restraining the rolled can body to a diameter not exceeding the desired finished can outside diameter. Ideally, the restraint system should have no circumferential gaps in which the body blank metal can buckle or otherwise deform thus defeating the desired diameter control.

A calibrating cage heretofore used was a sleeve construction wherein a large portion of the body blank was restrained by the almost cylindrical surface of the sleeve. This construction evolved from test fixture developmental trials devoted primarily to the body control and welding of low basis weight — 55# plate. Other welding cage configurations were evaluated such as a roller cage, air bearing, and ball bearing construction. The latter two developments were associated with a sleeve type cage geometry. The roller type cage type requires continuous adjustments of the can body embracing rollers which is extremely difficult in the environment in which the cage is located and is subject to visual observation and thus is inaccurate.

Competing welding processes utilizes a roller type cage for body control. The roller cage type, although continuously being modified by industrial manufacturers, has generally been successful for high basis weight plate exceeding 70#. Very little information, no less commercial operation, is available regarding the ability to control 55# plate bodies with a roller cage.

The continuous cylindrical sleeve type cage was previously employed in a commercial Z-bar operation.

The next stage in the Z-bar development process was to provide a commercial machine for the production of 211 × 713 aerosol cans. This required the utilization of 75# and 80# plate. One of the first observations made when welding the higher basis weight plate was that an increased frictional drag was imposed on the body blank when traversing the sleeve cage. The second and most serious observation was the formation of a defect at the leading edge of the can body. The most prevalent form of the defect was the formation of a thinned metal region just adjacent to the cut edge overlap at the lead edge. Sometimes the defect appeared as unbond despite adequate weld structure temperature or simply appeared as a single longitudinal crack in the welded overlap. No matter what appearance the lead edge defect had; the results were either cracks or effective cracks after flanging. The supposition was made that no matter what appearance the defect had, the cause was the same.

DESCRIPTION OF THE PROBLEM

After reviewing the nature of the defect, an assumption was made that stresses are induced at the lead edge. These stresses are tensile and tend to cause local yielding or a no-bond condition at the lead edge overlap. A possible explanation is that the stresses are induced if the seam overlap is slightly larger at the lead edge compared to the overlap down the remainder of the seam. Hence, the can body diameter could be slightly smaller at the lead edge than the balance of the body. Since equilibrium of stresses within the can body shell must exist, the very lead edge is placed in tension while the balance of body is in very slight compression. These stresses coupled with a substantial reduction in metal yield strength at the elevated temperature of the welded seam could produce the thinning. The way of avoiding this condition is to prevent the lead edge overlap from being too wide just prior to the onset of welding.

SOLUTION OF THE PROBLEM

The sleeve type of welding cage imposes a continuous restraint on the body blank as it progresses towards the welding electrode. The blank becomes tightly confined at the downstream tip of the Z-bar and as motion continues toward the electrode, the lead edge is urged inward by the sleeve cage. Thus, the overlap of the body is encouraged to be large as it enters the nip of the electrode. Once welding of the overlap commences, forces are generated which tend to cause the overlap to diminish. Hence, the conditions for undesirable stresses at the lead edge are produced.

To overcome the preceding effect, the novel cage was developed which consists of one calibrating ring and one or moe axially spaced secondary control rings. The calibrating ring is located slightly upstream (i.e., approximately 0.060 inch) from the center line formed by the two electrodes. The secondary rings are located substantially upstream and serve to confine and control the body prior to entering the calibrating ring.

As the lead edge of the rolled body approaches the downstream tip of the Z-bar, the metal at the lead edge is unconstrained. This condition continues until the lead edge enters the nip formed by the electrodes. The entrance to the nip occurs approximately 0.150 inch upstream from the electrode center line. As the body progresses into the nip, it then comes into contact with the calibrating ring. The body is then urged inwardly by the calibrating ring. However, inward motion is impeded because the overlap is already in the nip and transverse sliding of the metal is difficult. The conditions for tensile stresses and thinning at the lead edge are therefore minimized.

SUMMARY OF THE INVENTION

The characteristics of the ring cage in comparison to a sleeve cage and roller cage can be summarized as follows:

1. The stress levels at the leading edge using the ring cage are lowered compared to the sleeve type. The effect is to minimize lead edge thinning.

2. The ring cage provides adequate drag forces for can body control. Adequate in the sense that the drag forces are lower than the sleeve cage, but higher than the roller cage. Because these drag forces are lower, there is greater process latitude since the body converging force requirements are lowered. An example of this latitude is that the taper in the can (diameter difference between top and bottom of the can) can be held to a smaller range when using the ring cage compared to a sleeve type cage. The drag in the ring cage is higher than the roller cage, but this is a desirable situation because if the drag is too low, the gripper type overhead chain dog utilized to progress the can body through the cage does not properly engage the can for transport. The can, therefore, is pushed by the dog, but can rotate over the powder stripe heads. This can cause poor stripe placement and a reject can. The ring cage provides sufficient drag to permit the dog to grip the can at the point of transfer to the dog (from the squaring fingers).

3. The ring cage provides line type contact as in the roller cage but is not as prone to creasing the can metal from roller misalignment as in the roller cage.

4. Maintenance is also lower because ball bearings are not required, as in the roller cage.

5. Better cage cooling can also be achieved with the ring cage compared to the roller cage.

6. If an insert type ring cage design is used, the inserts can be replaced without replacing the entire cage.

7. Within limits, can diameter changes using the insert design, can be made without changing the cage housing.

A principal object of the invention is to provide a novel ring cage which is effective to maintain the cylindrical contour of the can body through the welding cycle.

A further object is to provide a novel ring cage in which the body embracing rings are located to provide controlled drag and in which a calibrating ring at the welding area is positioned in close proximity thereto on the order of 0.60 inches upstream therefrom to produce an overlap at the lead edge slightly less than the remainder of the seam.

These and other objects and advantages inherent in and encompassed by the invention will become more apparent from the Specification and drawings wherein.

DESCRIPTION OF THE INVENTION

The apparatus to which the instant invention applies is well known to those skilled in the art, it being known to bend a sheet of steel or other metal into a generally cylindrical body. The progression is shown from FIGS. 3 to 9.

Figure 1:
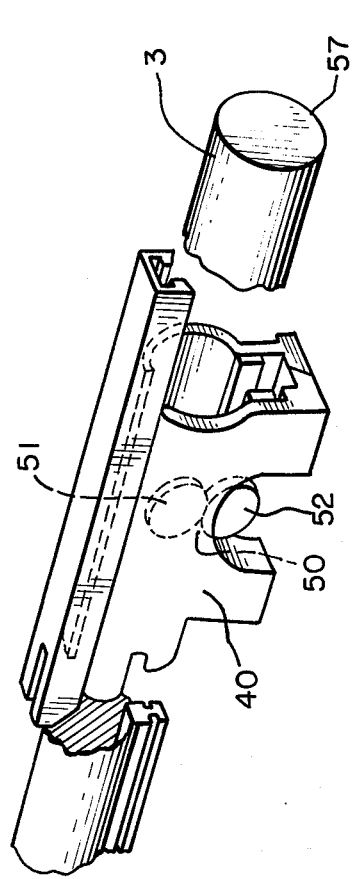
FIG. 1 is a perspective view of the novel apparatus shown generally diagramatically.
Figure 2:
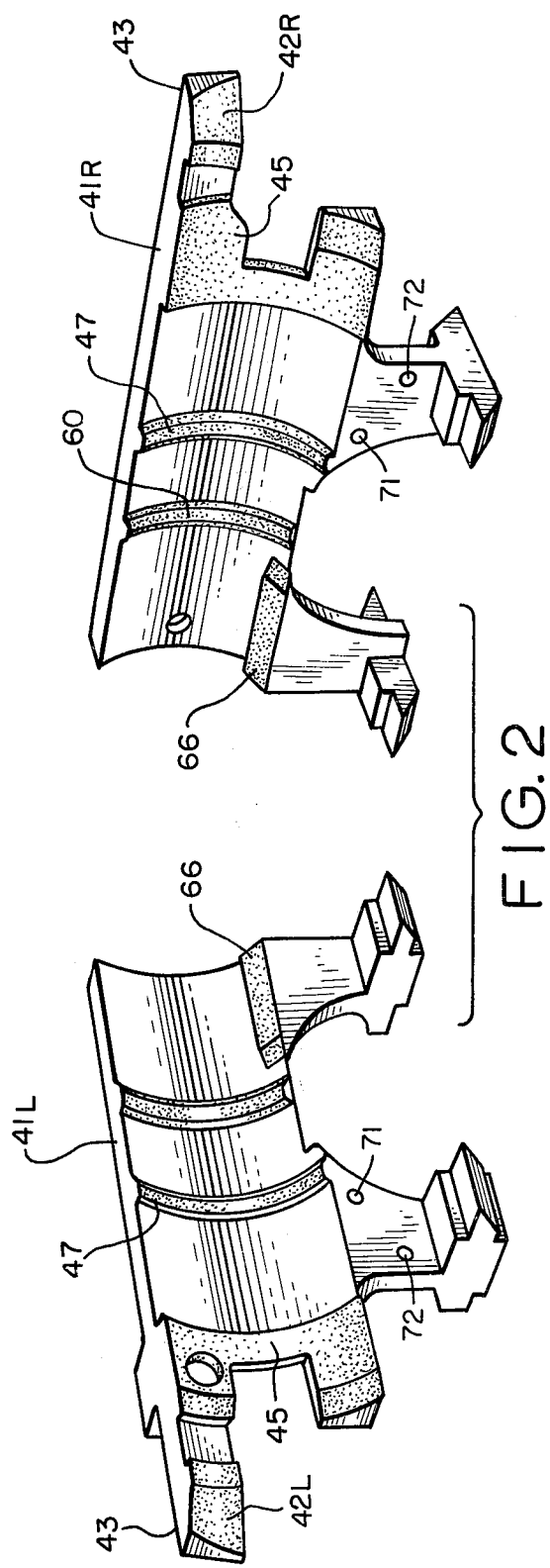
FIG. 2 is a perspective view of the two valves of the cage member.
Figure 3:
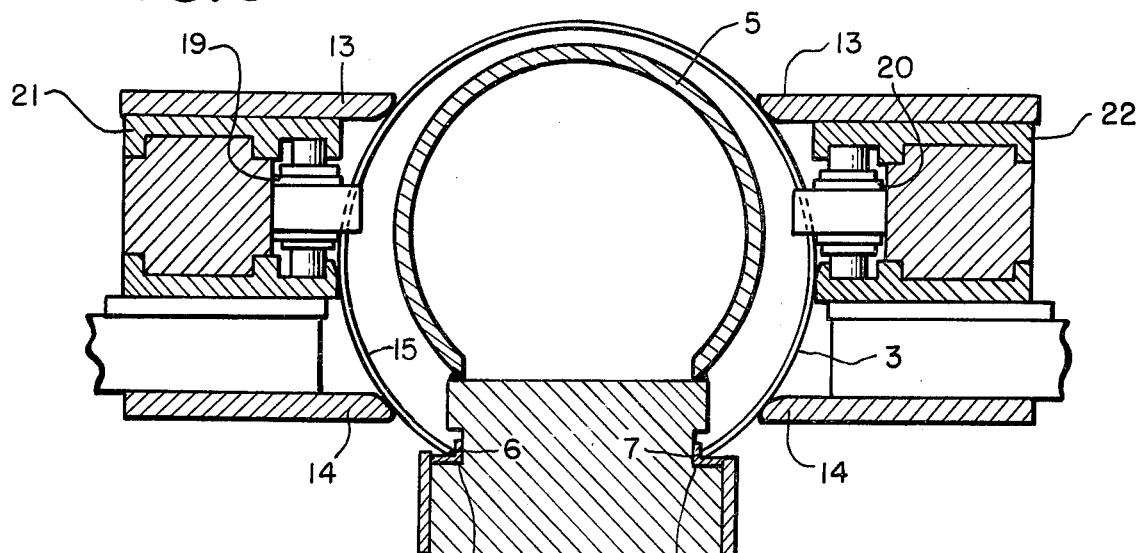
FIG. 3 is a cross-section of the horn and partially formed can body at the side chain pick-up station.

In FIG. 3, the body 3 is shaped about a horn 5 and the edges 6 and 7 are positioned into guides 9 and 10 mounted on the machine support frame 11. The body extends between opposed guide fingers 13,14 and is engaged along its rear edge 15 by the fingers 16,17 of conveyor chains 19,20 which are carried in side supports 21,22. As the can bodies are advanced, they are progressively made more cylindrical.

Figure 4:
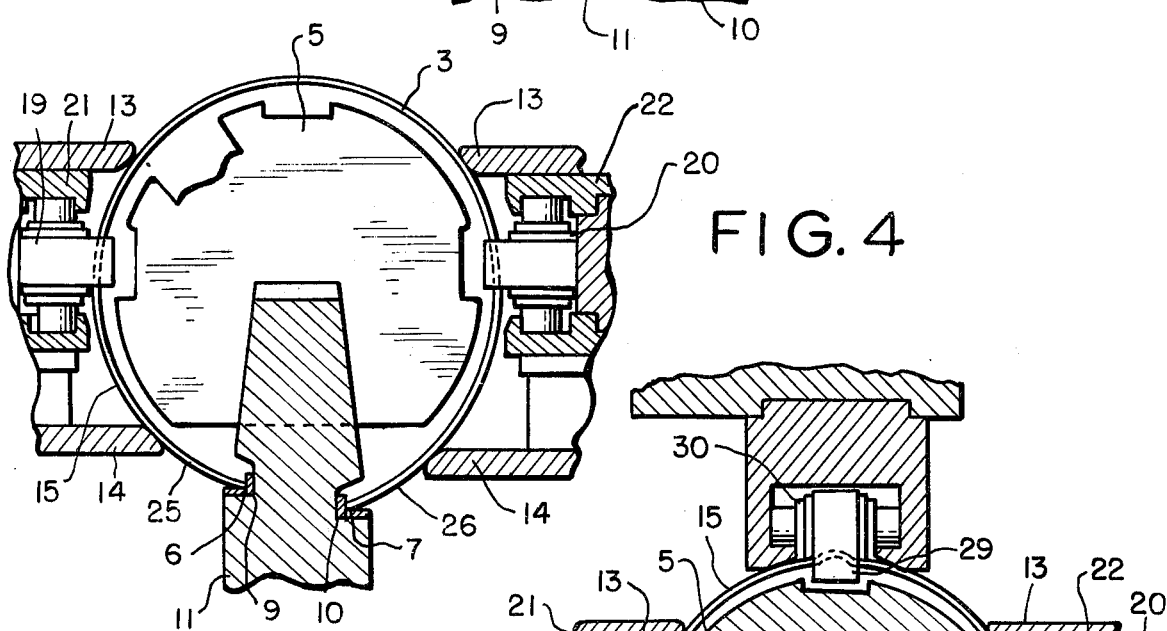
FIG. 4 is a cross-section of the horn and can body at the junction of the transition bar and stub horn.

In FIG. 4, the free edge 25,26 portions of the can body are offset in suitably positioned guides 9 and 10 preparatory to overlapping.

Figure 5:
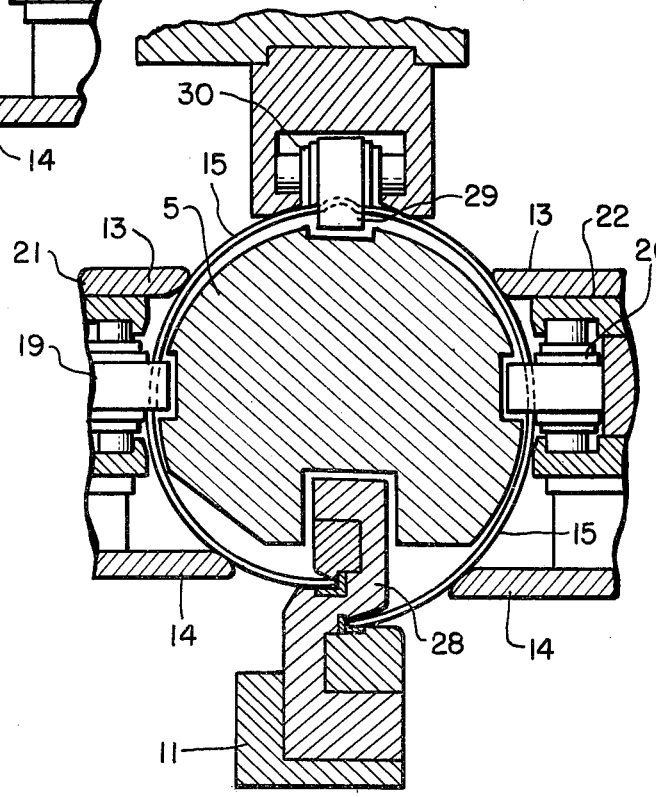
FIG. 5 is a cross-section of the horn and can body at the start of the first Z-bar.

In FIG. 5, the body edge portions 25,26 have progressed to the first Z-bar 28 to develop the overlap and the rear edge portion of the body is grasped by a finger clip 29 which is on a chain 30 supported above the can body.

Figure 6:
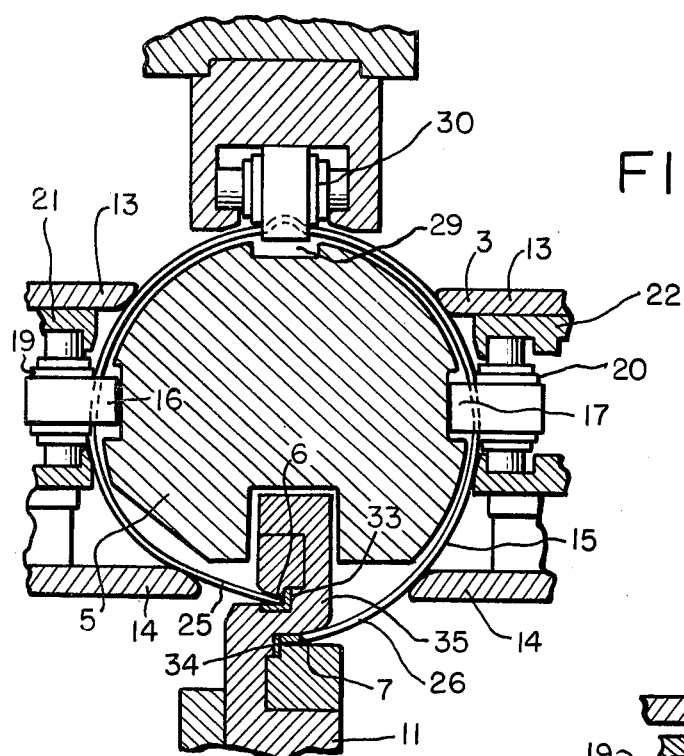
FIG. 6 is a cross-section of the horn and can body at the start of the parallel chain guides.
Figure 7:
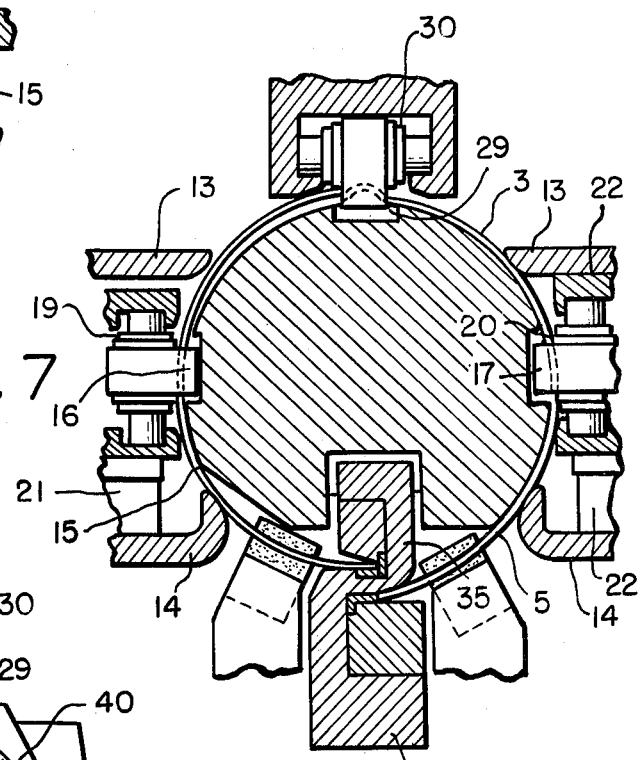
FIG. 7 is a cross-section of the horn and can body at the entrance end of the guide cage.
Figure 8:
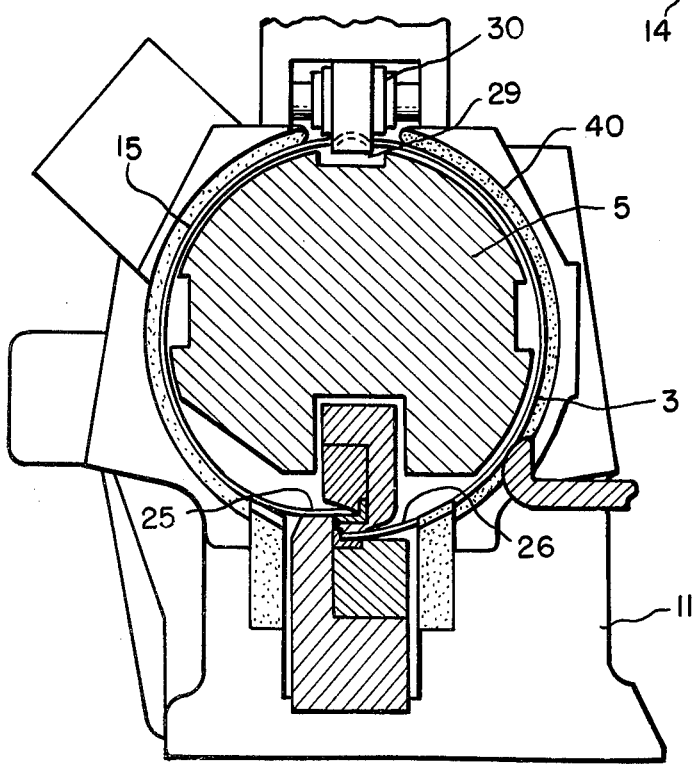
FIG. 8 is a cross-section through the horn and can body entered within the guide cage.
Figure 9:
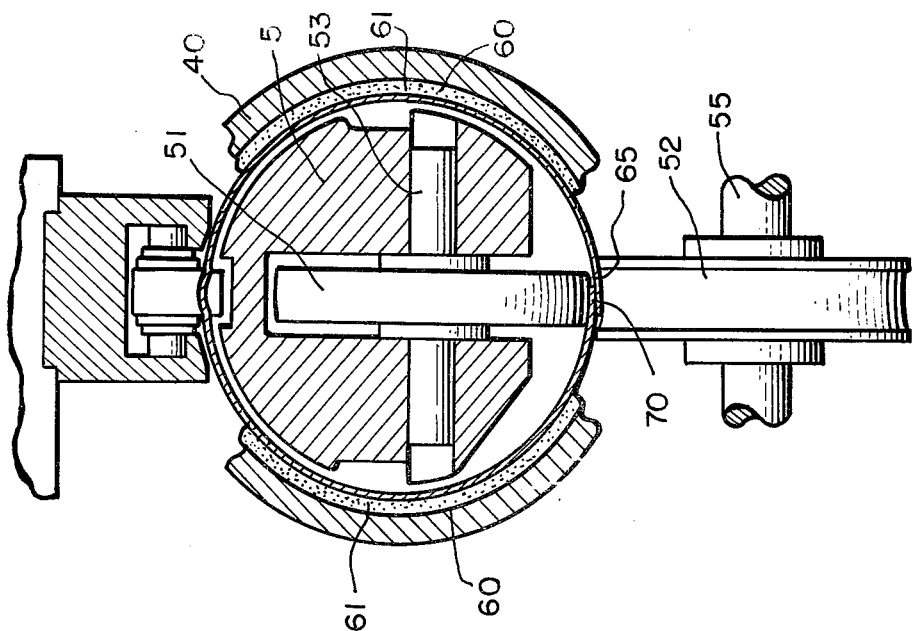
FIG. 9 is a cross-section taken substantially on line 9—9 of FIG. 10.
Figure 10:
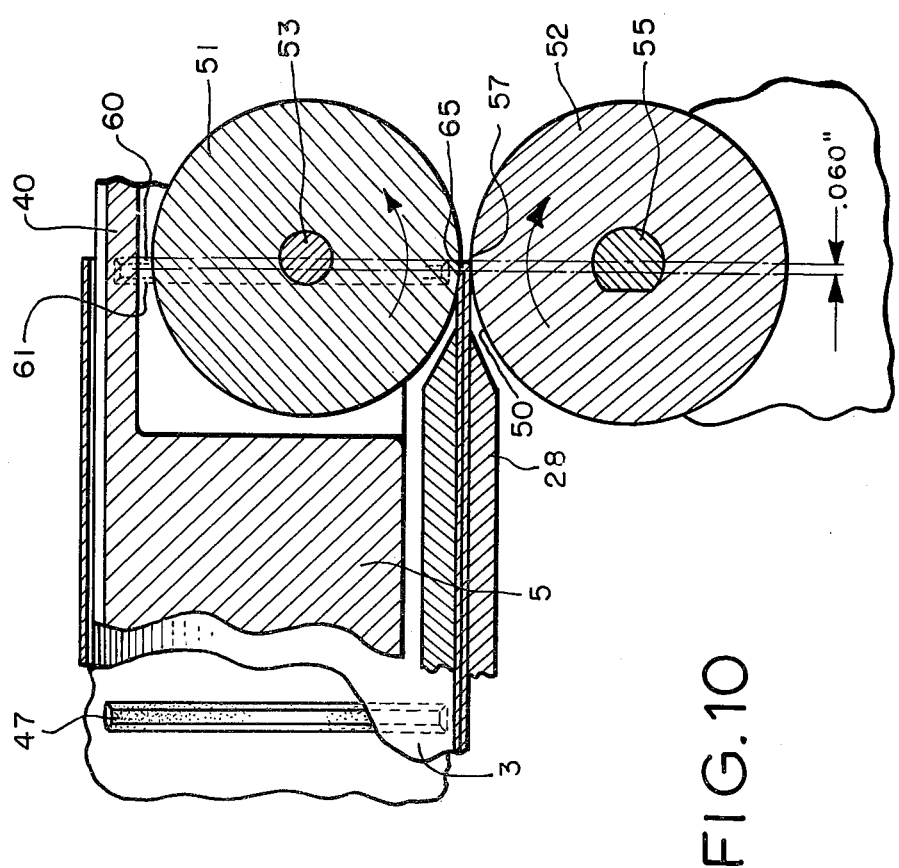
FIG. 10 is a longitudinal section generally on line 10—10 of FIG. 9.

In FIG. 6, the Z-bar guides 33,34 are almost in vertical alignment as well as the can body edges 6,7 are also substantially vertically aligned by the guides 33,34 of the second Z-bar 35. It will be noted that the leading end of the can in FIGS. 7 and 8 has entered and progressed into the ring cage 40 as best seen in FIGS. 1, 2, 9 and 10.

The cage is made of two counterpart halves 41R and 41L (R & L standing for Left and Right, respectively). The leading end of the horn has tapered lead in surfaces 42R,42L on lead in extensions 43,43 projecting in an upstream direction. Immediately following the surfaces 42R,42L are ring segments 45,45 which serve to impose a hoop compressive load on the body forcing the edges 6 and 7 against the now circumferentially offset sections of the guides 33,34 of the second Z-bar which extends between the spaced lower ends of the opposing cage sections. The container body is advanced by the upper chain 30, which with its fingers 29 runs between the upper edges of the ring halves, through an intermediate ring 47 formed as an embossment on the body portion of the cage and is fed with the overlapped edge portions 25 and 26 into the nip 50 of a pair of wheel type electrodes 51 and 52. The free rolling electrode is mounted on the horn on a horizontal pin 53 and the driven electrode 52 is suitably mounted on a horizontal axis on a pin 55 parallel with pin 53.

It has been found that control of the can body in this area is very critical since the leading end 57 of the can body at that point leaves the Z-bar. It has been found that when the edge portions of the can are squeezed between the electrodes, the metal because of the welding current passing therethrough melts and, unless restrained from spreading because of the pressure of the rollers, thins and causes the can body to distort.

It has been found that by providing a calibrating ring 60 composed of segments 61,61 approximately 0.060 inches in advance of the pressure point or grasp section 65 that the can body is held to dimension and will not spread circumferentially which has caused innumerable problems as heretofore mentioned.

Downstream of the calibration ring there are provided elongated guides 66,66 which extend downstream from the electrodes and provide supports for the can body in the area at opposite sides of the welded seam 70.

It will be appreciated that the rings and guide portions of the cage are preferably coated such as by flame spray with an alumina-oxide powder such as sold by Union Carbide Corporation under their label LA-2 or LA-6. The crests of the rings are all highly polished and made coaxial and concentric to the longitudinal axis of the cage and the guides are shaped to provide surface sectors coaxial with the crest areas of the rings.

Each half 41R and 41L has passages therein with inlets and outlets 71, 72 for circulating coolant fluid therethrough.

What is claimed is:

1. A ring cage for confining and forming a can body comprising a generally cylindrically shaped sheet of metal having overlapping circumferential edge portions,
    said cage comprising a pair of circumferentially spaced counterparts,
    each counterpart having a plurality of can body slidably engaging ring sectors on the interior thereof of limtied width axially of the cage, and a static calibrating ring on said counterparts located in an area to provide circumferential constraint to said body as said overlapping portions are passed between a pair of electrode rollers tending to circumferentially spread said portions apart.

2. The invention according to claim 1 and guide means interposed between said cage counterparts for holding said overlapping portions in desired relation, and said rollers disposed at the end of said guide means and presenting a nip and a grasp section immediately downstream of the nip, and said calibrating ring disposed slightly upstream of said grasp section in radial alignment with said nip (for holding) and close enough to hold the (can body) edge portions from spreading apart during welding.

3. The invention according to claim 2 and said calibrating ring having a smooth sector on each counterpart.

4. The invention according to claim 3 and guide surfaces on said cage disposed to engage the can body immediately as it exits from the electrodes in areas flanking the overlapped welded seam of the body.

5. The invention according to claim 4 and means for cooling said cage comprising a plurality of water passages discretely formed in said counterparts and having inlets and outlets for circulating fluid from an associated source and discharging such fluid.

6. The invention according to claim 2 and said static ring being spaced upstream from the grasp section of the electrode rollers approximately 0.060 inches.

7. The invention according to claim 6 and said nip section being spaced in advance of said grasp section approximately 0.150 inches.

8. The invention according to claim 1 and said ring sectors being spaced axially of the cage.

9. The invention according to claim 8 and said cage comprising a leading end having tapered lead surfaces.

10. The invention according to claim 1 and said rings being coated with alumina-oxide powder.

11. A ring cage for confining and forming a can body comprising a generally cylindrical shaped sheet of metal having overlapped circumferential edge portions, said cage having a plurality of raised axially spaced internal static control rings of limited width axially of the cage, said control rings each having a slide surface for slidably engaging the can body, and a static calibrating ring located within the cage and spaced downstream of said control rings and located in a position to constrain circumferential expansion of said body in the area whereat said overlapped portions of the can body are passed between a pair of welding electrodes tending to spread said portions apart.

* * * * *